Figure 1:
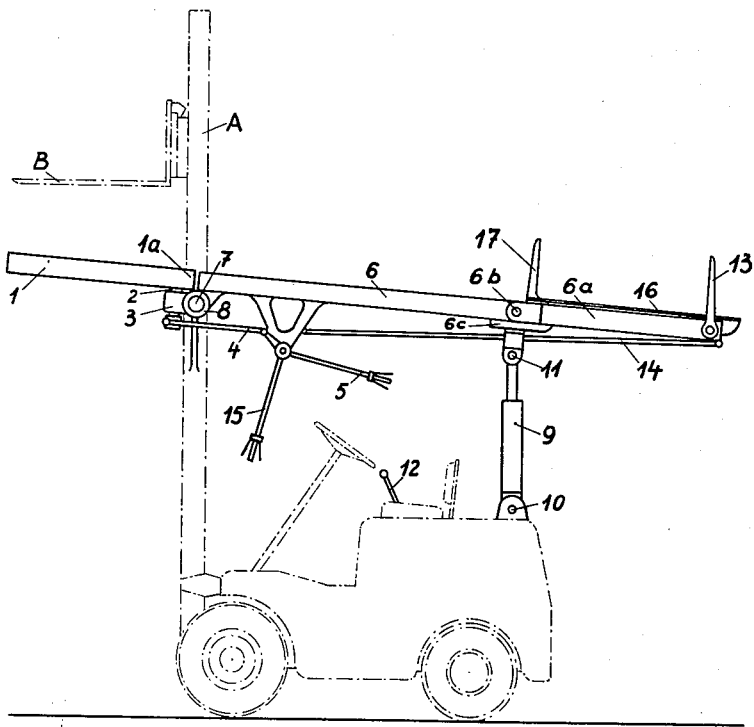

Dec. 27, 1955　　　B. WESSEL　　　2,728,474
INDUSTRIAL HOISTING TRUCK

Filed March 13, 1953　　　　　　　　3 Sheets-Sheet 1

Bernhard Wessel
by Dezsoe Steinherz
Attorney

Dec. 27, 1955   B. WESSEL   2,728,474
INDUSTRIAL HOISTING TRUCK
Filed March 13, 1953   3 Sheets-Sheet 2

Dec. 27, 1955  B. WESSEL  2,728,474
INDUSTRIAL HOISTING TRUCK
Filed March 13, 1953  3 Sheets-Sheet 3
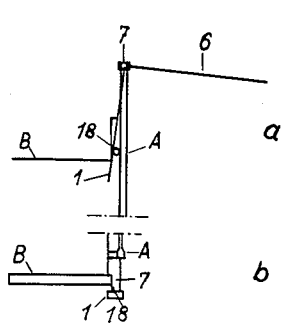
Fig 7
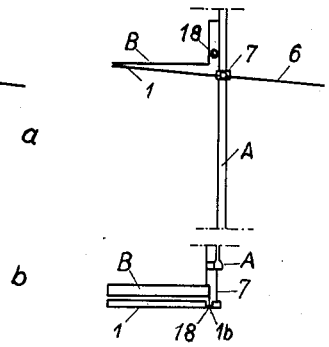
Fig. 8
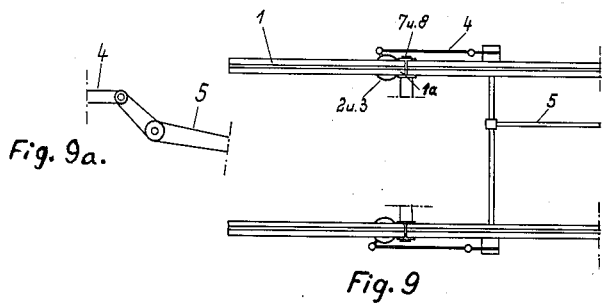
Fig. 9a.
Fig. 9
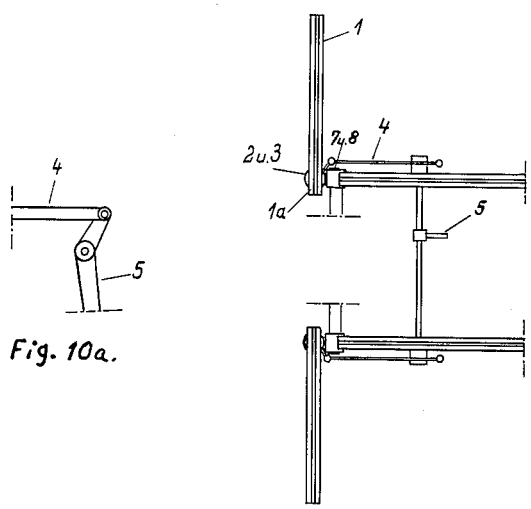
Fig. 10a.
Fig. 10

United States Patent Office 2,728,474
Patented Dec. 27, 1955

2,728,474
INDUSTRIAL HOISTING TRUCK

Bernhard Wessel, Frankfurt am Main, Germany, assignor to Rutgerswerke - Aktiengesellschaft, Frankfurt am Main, Germany Application March 13, 1953, Serial No. 342,099

Claims priority, application Germany March 20, 1952

7 Claims. (Cl. 214—501)

This invention relates to devices for loading, unloading and transporting goods of various kinds and it has particular relation to devices which consist of motor vehicles provided with means for loading and unloading such goods and are often denoted lifting or hoisting trucks.

Lifting or hoisting trucks are primarily motor vehicles having 2 axles and provided in front of, or between, the front wheels with a vertical, if desired telescopic, lifting device, which comprises 1, 2, or 3 lifting forks for taking up the articles to be loaded. Such devices are adapted to take up goods by means of said lifting forks, to transport the load and to stack it in high stacks, and can be satisfactorily used for example in building material plants and wood working plants. However, the known devices of this type have in many cases the essential disadvantage that they must be turned between the loading and discharging step by 180° because in the known constructions the lifting forks must point in the direction of the goods to be loaded.

The known lifting trucks have also other disadvantages, such as the necessity of frequent switching, considerable consumption of energy and the relatively large area required for their operation. Their most important disadvantage consists, however, in the fact that in view of the necessity of turns during operation of the vehicles, a considerably higher solidity of the ground is required than for their driving in straight direction. This requirement of sufficient solidity of the ground in view of turns to be made may mean the necessity of investments to such extent that the use of lifting trucks, which is rather economical in general, becomes uneconomical.

Moreover, in frequent cases the lifting truck cannot be used at all in view of the necessity of turns by 180°, although, apart from this, it could be used very satisfactorily. Such cases are, for example, those in which the distance between loading point and discharging point is very short and the lifting truck can move only between these two points. For example, if in a storage hall the goods have to be transported from a railroad car to a stack near said railroad car, then the known lifting trucks can be used only if said distance is larger than the smallest circle within which turning can be effected plus about the double of the length of the fork, i. e. in the case of a 2 ton truck about 22½ feet.

The present invention relates to a lifting truck which is provided with additional means for rendering the lifting truck capable of loading and discharging goods at the front end, as well as the rear end of the truck, so that the truck has to be driven at a straight path between the point of loading and discharging, respectively, straight ahead only, and the requirements of solidity of the ground, consumption of energy, time and space required, are correspondingly reduced.

The additional means used according to the present invention consists of a substantially horizontal transport track or runway which is arranged over the entire length of the lifting truck in such manner (a) that the transport cart for taking up and transporting the load can run, without being hindered, over the retracted lifting device; (b) that the lifting device can be advanced without being hindered; (c) that the unloaded lifting forks can be passed through the front portion of the transport track; and (d) that after deflection of the front portion of the transport track the lifting forks loaded with the desired load can be moved up and down, without being hindered.

These objects are atained by forming the transport track in the length of the transport cart, i. e. the front track, as a rule from 2 rail like parts, arms or forks, which can be moved up and down on the lifting device or can be deflected laterally or are retractable. This release of the vertical lifting track is preferably carried out in such manner that simultaneously the transport cart is prevented from rolling forward beyond the lifting device and from dropping from the transport track. In a similar manner, suitable holding means are applied also to the ends of the transport track.

The transport track proper, which is located behind the lifting device, i. e. the middle track, is either rigidly connected to the truck, or is tiltably arranged about a bearing in a vertical plane on the lifting device. In the last mentioned case, a lifting device for lifting and lowering the transport track, is arranged on the rear part of the truck. In case of the rigid arrangement, as well as in the case of the tiltable arrangement of the middle track, the rear end of the latter can be movably arranged in vertical direction in the length of the transport cart so that the transport cart can be brought into horizontal position independently from the position of the middle and front track and thus utilized to a certain extent in a manner similar to that of conventional lifting forks at the front end of the vehicle. Thus, the transport cart can be used for discharging and loading the goods at the tiltable rear end of the middle track, in a manner similar to that of lifting forks.

The transport track, particularly the middle track, is preferably designed in such manner that it serves also as a means for protecting the driver and the vehicle from damage by dropped load.

The transport cart can run automatically on the transport track adjusted to an inclined position or it can be moved by a particular drive, for example a cable pull operated by hand or by a motor. The transport cart can also be connected by means of springs with the ends of the transport track in such manner that it is accelerated upon starting by one end of the transport track and is braked upon its arrival on the other end, so that too hard shocks with the buffers are avoided.

In carrying out the present invention, the load is taken up by the lifting forks, and is then taken over by the transport cart of the transport track, transported to the rear end of the vehicle and can be deposited, taken off or thrown off from there. This operation is reversible, i. e. the load can be taken up by the transport cart, in accordance with the principle of the lifting means of the device at the rear end of the transport track, transported subsequently in forward direction and taken over and deposited by the lifting device.

The appended drawings illustrate by way of example some embodiments of the invention, to which the invention is not limited.

Figure 2:
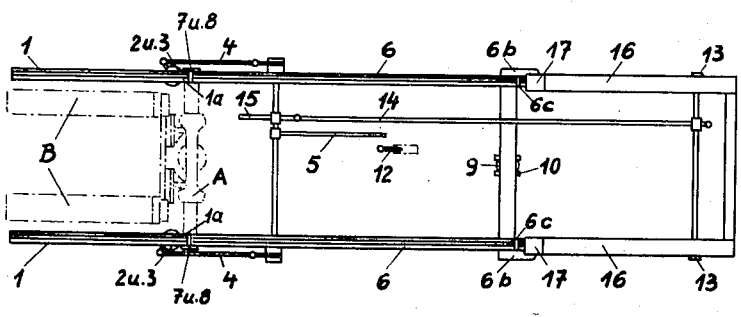

Figures 1 and 2 diagrammatically illustrate in side view and top view, respectively, one embodiment of the invention; Figures 3–6 illustrate the use of the device according to the invention for handling wooden cross-ties; Figures 7 and 8 diagrammatically illustrate in side view and bottom view, respectively, means for tilting upward front track 1; Figures 9 and 10 show various adjustments of pivoted member 1; and Figures 9a and 10a show in side view some parts illustrated in Figures 9 and 10.

Referring now to the drawings in detail, Figures 1 and 2 show in thin lines the known elements of a conventional lifting truck for loading, transporting and discharging, i. e. the truck or vehicle proper, the movable lifting device A provided with lifting forks B, the height of which can be adjusted, while the parts corresponding to the present invention are shown in heavy lines in these figures. The transport track is denoted by reference numerals 1, 6 and 6a. Transport cart 16, 17 runs on the transport track and its width is selected in such manner that lifting device A and lifting forks B can be passed without being hindered between the transport rails in both directions when transport cart 16 is located behind lifting device A. The rails in which the 4 wheels of transport cart 16 run consist of channel beam girders, which are provided at the lower inner edge with a guide rim for guiding the wheels of the cart, and, in the case of the front track, also for preventing dropping of the cart upon inadvertent deflection of the lifting forks.

Reference numeral 1 denotes the front track which is journalled in bearings 3 and thus rotatable about vertical axes, so that the arms of the front track can be tilted laterally over lever system 4 by means of control lever 5 by 90°. By a slight change of the construction, the arms of the front track can be made rotatable about horizontal axes so that they can be deflected in downward direction.

The middle track 6 is rotatable in bearings 8 about horizontal pivots 7. Upon turning middle track 6 about pivots 7, for example, by the action of hydraulic device 9, front track 1 and middle track 6 always remain in the same plane, because bearings 3 for front track 1 and bearings 8 for middle track 6 are rigidly connected and therefore movable in the same manner about pivots 7. Turning device 9 is elastically mounted at 10 and 11 and can be used for adjusting middle track 6 and simultaneously front track 1, with an inclination in forward or rearward direction, or to horizontal position, by means of control lever 12.

The hydraulic device 9 is preferably utilized also for actuation of lifting device A or vice versa.

Rear track 6a is rotatable in the length of lifting forks B, or of transport cart 16, about horizontal pivots 6b in such manner that it can be deflected above the plane of middle track 6 but not below this plane. A corresponding device is indicated at 6c. The rear track 6a is provided at its outer end with a holding device 13, 13, which can be actuated over lever system 14 by means of control lever 15, so that inadvertent sliding off of the load from rear track 6a cannot take place.

Reference numeral 16 denotes the transport cart which runs in the channel beam girders of the front, middle and rear tracks 1, 6, 6a, and the runway of which is limited by stopping means, for example buffers, at the front ends of front track 1 and the rear ends of rear track 6a. Transport cart 16 is provided at its front end with 2 upward bent elements 17 for preventing sliding of the load in forward direction. As mentioned above, inadvertent sliding off of the load in rearward direction is prevented by holding means 13, 13. Dropping of transport cart 16 in forward direction from rear track 6, when front track 1 is deflected, is automatically effected by projections 1a of front track 1.

Operation of the lifting truck embodying my invention is illustrated by way of example in Figures 3–6, in which unloading and stacking, as well as loading from the stack of wooden cross-ties or the like, is shown. In the device shown in these figures, lifting forks B point in all transport steps preferably in the direction of the stacks because in the steps illustrated in these figures the goods are loaded and must be taken up and deposited at considerably varying heights.

Figure 3:
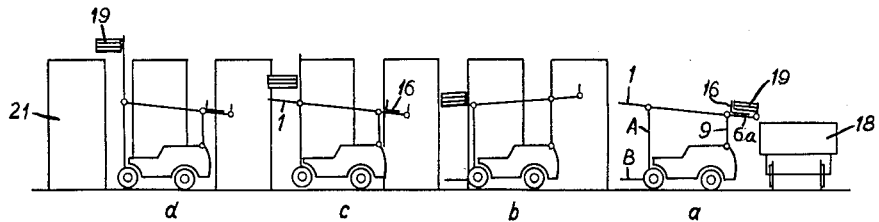
Figure 6:
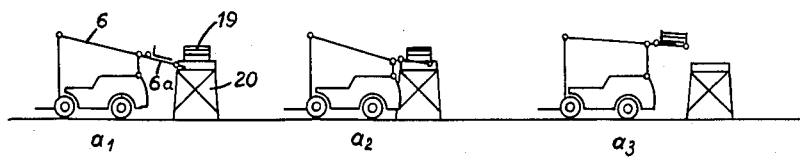

In the procedure illustrated in Figure 3, action of the lifting truck according to the invention starts in position a. Transport cart 16 is located in rear track 6a and is loaded there from railroad car 18. If taking up of the load takes place in accordance with the principle of the lifting device of the hoisting truck, middle track 6 and rear track 6a are lowered to such extent that the middle track can take up the load from a stand or trestle 20 located near the railroad car. This operation is illustrated in Figure 6 (positions $a_1$, $a_2$, $a_3$).

Upon driving the lifting truck in the direction of the stack (see Figure 3) the middle track and rear track 6, 6a, are lifted to such extent that transport cart 16 carrying the load 19, automatically rolls to front track 1 (position b). Subsequently the lifting forks B are lifted in order to take over the load, device 9 is lowered, whereby transport cart 16 rolls back to its initial position (position c), whereupon front track 1 is laterally deflected. Upon arriving in position d, the device discharges the load on the stack 21, in a manner known by itself. During driving back to position a, lifting forks B are lowered and front track 1 is returned to its original position. Thus the procedure of unloading and stacking can be repeated.

Figure 4:
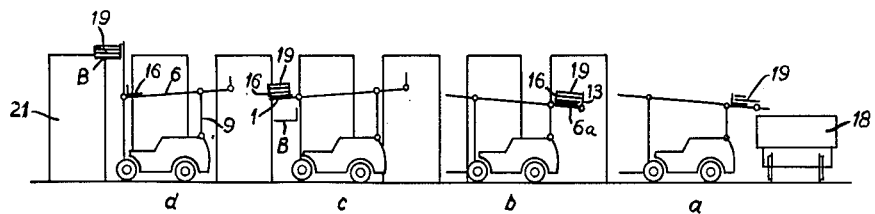

In the procedure illustrated in Figure 4, the procedure is started in posiiton d, i. e. the hoisting truck takes up a load 19 of cross-ties by means of lifting forks B from the stack 21. Thereby device 9 is advanced to such extent that the transport truck is inclined in forward direction. When driving in the direction toward the railroad car, the front track 1 is tilted back, transport cart 16 rolls in forward direction and can take over the load from lifting forks B as shown in position c. Shortly before arriving in position a, device 9 is lowered and transport cart 16 carrying the load, rolls to rear track 6a, whereby holding device 13 is in operative position if immediate discharge of the cross-ties to the railroad car is not desired (position b).

During driving back to position d, lifting forks B are lifted, front track 1 deflected and device 9 is advanced to such extent that transport cart 16 rolls in front of the end portions of front track 1. The procedure of taking cross-ties from the stack, transporting and loading them, can be started again now.

Figure 5:
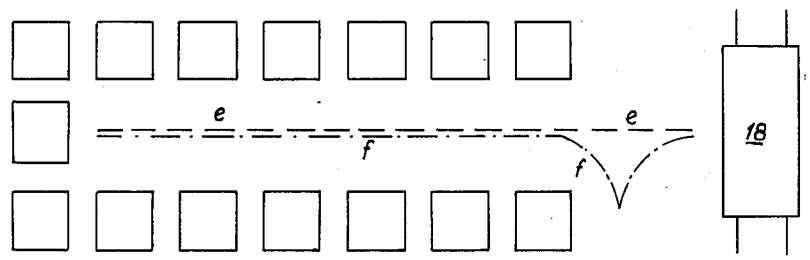

Figure 5 is a ground view pertaining to Figures 3 and 4, and this ground view illustrates simplification of the runway, resulting from the present invention. This simplification is mainly attained by the elimination of turns. If, for some reason, lateral deflection of front track 1 is undesirable, the device can be constructed also in such manner that deflection takes place in downward direction. Such downward deflection can be brought about easily, because it has to be released only and is then continued automatically by the weight of front track 1. Means for deflection in upward direction are shown in Figures 7 and 8, in which side views a, are shown together with halves of ground views b. These figures show lifting track A of the hoisting machine with its lifting forks B, as well as front track 1 and middle track 6, which are rotatably arranged about pivots 7. Tilting in upward direction of front track 1 takes place according to Figures 7a and 7b automatically by lifting forks B which are provided with a horizontal driving element 18, which acts on front track 1 only upon movement of forks B in upward direction and must be thus tiltable in upward direction. Front track 1 has a slot 1b which is arranged in such manner that front track 1 is lifted only up to the plane of the middle track 6. Figures 8a and 8b show lifting forks B already above front track 1. In a similar manner, movement of lifting forks B can be utilized for tilting in upward direction. In many cases, manual operation of front track 1 from the driver's seat will be preferable.

It will be understood by those skilled in the art that the new device embodying the present invention can be used not only for the transport of cross-ties and the like, but also for other materials of most varied types, for example, for the transport of coal, bags, baskets, building materials and the like, and can be easily adapted in the details of its construction to any desired purpose.

It will be also understood that the invention is not limited to the specific materials, elements, construction parts and other details specifically described above and can be carried out with various modifications, without departing from the scope of the invention as defined in the appended claims.

The terms "lifting truck" and "hoisting truck" are used in the persent specification and claims to denote devices of the type described and illustrated in the drawings, for unloading, transporting and stacking or loading goods.

What is claimed is:

1. A hoisting truck comprising in combination a motor vehicle carrying a lifting device vertically movable in up and down direction in order to advance and retract the same, and provided with at least one lifting fork for load; a substantially horizontal transport track extending over the entire length of the vehicle, having a tiltable track part extending in front of the lifting device, said transport track having an inner width which is larger than the width of the lifting fork in order to allow movements of the lifting device; a transport cart movable in said transport track, for loading and unloading goods at both ends of the vehicle; said transport track being arranged at a height at which the transport cart can be passed in said track over the retracted lifting device, the transport track consisting of a front track located in front of the lifting device and a middle track arranged behind said lifting device, said front track being tiltable and retractable laterally as well in upward and downward direction.

2. A hoisting track as claimed in claim 1, in which the transport track consists of a front track located in front of the lifting device and a middle track arranged behind said lifting device, said middle track being capable of being turned in vertical direction and, when turned, carrying along the front track in said direction.

3. A hoisting track as claimed in claim 1, in which the transport track consists of a front track located in front of the lifting device and a middle track arranged behind said lifting device, and means for causing adjustment of the middle track are arranged on the vehicle.

4. A hoisting track as claimed in claim 1, in which the transport track consists of a front track located in front of the lifting device and a middle track arranged behind said lifting device, and hydraulic means for actuating the lifting device and causing adjustment of the middle track are arranged on the vehicle.

5. A hoisting track as claimed in claim 1, in which the transport track consists of a front track located in front of the lifting device, a middle track arranged behind said lifting device and a rear track located behind said middle track, said rear track being capable of being turned only vertically upward above the plane of the middle track.

6. A hoisting track as claimed in claim 1, in which the transport track is formed by channel beam girders, in which the wheels of the transport cart are adapted to roll and the interior of which is provided with a guide rim for the wheels.

7. A hoisting track as claimed in claim 1, in which the transport track consists of a front track located in front of the lifting device, a middle track arranged behind said lifting device and a rear track located behind said middle track, and means are provided for limiting movement of the cart to the middle and rear track, in tilted position of the front track.

References Cited in the file of this patent

UNITED STATES PATENTS

| Number | Name | Date |
|---|---|---|
| 1,297,486 | Murray | Mar. 18, 1919 |
| 2,045,566 | Berg | June 30, 1936 |
| 2,194,125 | Rinehart | Mar. 19, 1940 |
| 2,350,449 | Couch | June 6, 1944 |
| 2,510,573 | Gray | June 6, 1950 |
| 2,556,399 | Sanger et al. | June 12, 1951 |
| 2,613,827 | Van Doorne | Oct. 14, 1952 |
| 2,621,811 | Lull | Dec. 16, 1952 |